(12) United States Patent
Dussaume et al.

(10) Patent No.: US 8,787,387 B2
(45) Date of Patent: Jul. 22, 2014

(54) METHOD FOR TRANSMITTING DATA AND RELATED SERVICE DATA

(75) Inventors: Philippe Dussaume, Lannion (FR); Yvon Guillot, Trebeurden (FR); Jean-Louis Cheviet, Saint Croix de Beaumont (FR)

(73) Assignee: France Telecom, Paris (FR)

( * ) Notice: Subject to any disclaimer, the term of this patent is extended or adjusted under 35 U.S.C. 154(b) by 1113 days.

(21) Appl. No.: 11/885,702

(22) PCT Filed: Mar. 1, 2006

(86) PCT No.: PCT/FR2006/050187
§ 371 (c)(1),
(2), (4) Date: Mar. 10, 2008

(87) PCT Pub. No.: WO2006/092537
PCT Pub. Date: Sep. 8, 2006

(65) Prior Publication Data
US 2008/0192725 A1    Aug. 14, 2008

(30) Foreign Application Priority Data

Mar. 4, 2005    (FR) ...................................... 05 02197

(51) Int. Cl.
| | | |
|---|---|---|
| H04L 12/58 | (2006.01) | |
| H04M 3/42 | (2006.01) | |
| H04L 29/08 | (2006.01) | |
| H04L 29/06 | (2006.01) | |
| H04L 29/12 | (2006.01) | |
| H04Q 3/00 | (2006.01) | |

(52) U.S. Cl.
CPC .......... *H01L 29/06176* (2013.01); *H04L 67/14* (2013.01); *H04L 65/602* (2013.01); *H04L 61/6063* (2013.01); *H04L 61/35* (2013.01); *H04M 2207/12* (2013.01); *H04Q 3/0054* (2013.01)

USPC .... 370/395.3; 709/228; 709/245; 379/221.09

(58) Field of Classification Search
CPC ................... H04L 29/06027; H04L 29/06176; H04L 29/12783; H04L 29/12924; H04L 67/14; H04L 67/306; H04L 65/602; H04L 61/35; H04L 61/6063; H04M 2207/12; H04Q 3/0054
USPC ........... 370/349, 389, 392, 393, 395.2, 395.3, 370/352–356; 709/218, 226–229, 245, 709/204–206; 379/88.19–88.21, 93.03, 379/15.01, 15.02, 15.04, 32.03, 114.28, 379/114.29, 220.01, 221.05–221.14
See application file for complete search history.

(56) References Cited

U.S. PATENT DOCUMENTS 6,832,254 B1 * 12/2004 Scoggins et al. .............. 709/227
7,154,999 B2 * 12/2006 Florkey et al. ........... 379/142.01
(Continued)

OTHER PUBLICATIONS

Gorski, Daniel T., "29.2 Was ist eine Session-ID? Was ist PHPSESSID?" [online] 2004, pp. 1-2, Extrait de l'Internet: URL:http://faq-php.de/q/q-php-ws.html.

*Primary Examiner* — Habte Mered
(74) *Attorney, Agent, or Firm* — Cozen O'Connor

(57) ABSTRACT

A method of transmitting data and service information associated with said data, including an addressing step during which a set of service information D(Si) that is intended to be stored is referenced by means of an address AD. The address AD includes a session identifier Si, a session being defined as a string of successive activations of different communications means. Service information D(Si) is marked unequivocally by means of an identifier Si that is invariant throughout the session concerned. Thus no element external to that session can reach or degrade the service information, and its permanence is guaranteed until the end of the session.

10 Claims, 4 Drawing Sheets

(56) References Cited

U.S. PATENT DOCUMENTS

| | | | |
|---|---|---|---|
| 7,215,755 B2 * | 5/2007 | Novack | 379/221.11 |
| 7,317,792 B2 * | 1/2008 | Novack | 379/221.11 |
| 7,526,080 B2 * | 4/2009 | Novack | 379/221.11 |
| 7,792,270 B2 * | 9/2010 | Novack | 379/221.11 |
| 7,930,253 B1 * | 4/2011 | Schoenhals | 705/80 |
| 2004/0024817 A1 * | 2/2004 | Pinkas | 709/203 |
| 2004/0186891 A1 * | 9/2004 | Panec et al. | 709/206 |
| 2005/0204045 A1 * | 9/2005 | Belkin et al. | 709/227 |

* cited by examiner

METHOD FOR TRANSMITTING DATA AND RELATED SERVICE DATA

RELATED APPLICATIONS

This is a U.S. National Phase Application under 35 USC 371 of International Application PCT/FR2006/050187 filed on 1 Mar. 2006.

FIELD OF THE INVENTION

The present invention relates to a method of transmitting data and service information associated with said data, the method including an addressing step during which a set of service information that is to be stored is referenced by means of an address.

BACKGROUND OF THE INVENTION

Such methods are used at present in telecommunications systems operated by the applicant to transmit and temporarily store service information in the form of context or profile information relating to a user of the system accompanying data sent by that user. The elements that are called "data" here usually form an essential body of the call, which, in the current state of the art, is in principle initiated by said user. This data can consist of data representing a speech signal and/or a video signal produced by the user, for example. The context or profile information can consist of a geographical location or a list of areas of interest specific to this user, for example.

In the current state of the art, a telecommunications system making use of the method described above includes a main communications network, such as a switched telephone network, adapted to connect a terminal made available to the user to a first server, referred to as the upstream server, identified as the first addressee of a call that the user has initiated, for example by entering a predetermined code on an alphanumeric keypad of the terminal. For example, the first server could be a voice server adapted to receive a verbal enquiry from the user and to route that enquiry, and therefore the call in progress, to a second server, referred to as the downstream server, that the upstream server has identified as supporting a service adapted to address the enquiry formulated by the user.

In the known system, if the upstream server reroutes the call to the downstream server, the upstream server can store the service information beforehand in a particular location of a memory space in an auxiliary server and send an address identifying said particular location via a signaling link provided for this purpose. In this instance, that address is formed by the combination of an IP (Internet Protocol) address assigned to the auxiliary server and an address of a memory port internal to said auxiliary server where the service information is actually stored.

In the current state of the art, no particular precautions are implemented relative to the auxiliary server assigning port addresses, with the result that a port address could be reassigned during a session to a third party element external to the current session. By writing new data at the port address concerned, that third party element could then overwrite service information originally stored at that port address.

Moreover, the inventors have found that, in the current state of the art, if a session is defined as a string of successive activations of different communications means, for example the terminal of the user and the upstream and downstream servers referred to above, service information stored by one of these communications means is linked to those means and is liable to disappear very quickly after those means have ceased to be involved in the current session. However, when a session is defined in the manner proposed by the inventors, it must be possible for a user to interrupt a call without the session itself being interrupted, so that in this situation servers such as the upstream and downstream servers referred to above can take over and proceed with processing data supplied by the user while there is no connection, before calling the user back to provide the results of processing the data. In known telecommunications systems such continuity of the current session cannot be accompanied by continuity of the service information, which means that at present conducting communications sessions where one or more of the parties involved could be disconnected temporarily or permanently cannot be envisaged without this interrupting the data processing system.

Generally speaking, in known telecommunications systems, there is therefore no guarantee as to the permanence of service information stored in the auxiliary server. Furthermore, if during a session one of the entities involved instructs dynamic storage of service information additional to service information previously stored by the same entity, no link can be established between the additional service information and that stored previously, although in theory such a link would be useful for the addressees of the information, who might need to process all of the service information simultaneously, for example, which processing would then be facilitated by grouping the information together.

SUMMARY OF THE INVENTION

An object of the invention is to solve the problems described above by proposing a data transmission method and system in which all service information pertinent to a current communications session can be recognized as such, in particular so that it can be retained throughout said session.

A method in accordance with the invention conforming to the introductory paragraph is characterized in that the address by means of which a set of service information is referenced includes a session identifier.

The invention marks service information unambiguously by means of an identifier that does not vary during the session concerned and that can also be sent to all of the communications means involved during said session. Thus, in theory, no element external to the session can access or degrade this service information, and its permanence is therefore guaranteed until the end of the session.

In many applications, the session identifier could consist of a character string that is too long to be transported as such over the main communications network in order to communicate it from an upstream server to a downstream server. In a variant of the invention, the above method then advantageously includes:

a step of generating a call identifier intended to form part of the address assigned to a given set of service information and to be linked temporarily to a session identifier specific to the session concerned; and a step of transmitting said call identifier via a signaling link set up between two communications means.

Since the call identifier is more volatile than the session identifier, in that it is useful only for transmission between said two communications means, it can be coded by means of a much shorter character string than that of the session identifier, for which permanence is to be guaranteed regardless of the length of the session. This shorter length makes it possible to send the call identifier by means of a signaling link that could not send the session identifier itself.

Moreover, although the session identifier is unique, the above variant of the method of the invention stores multiple sets of service information, for example dynamically, by means of multiple call identifiers all linked to the unique session identifier, which multiple sets of service information can then be identified as linked to one another because of the common relationship of all their call identifiers to the current session identifier.

Moreover, it is to be noted that the generation step could be executed not only after the identifier of the session concerned is generated but also before it is generated. In fact, it is entirely feasible to provide a procedure for creating and reserving call identifiers that would be triggered by each of the communications means at the time of its initialization, so that, to generate an address intended to reference a particular set of service information, each communications means thereafter has only to establish an association between a pre-existing call identifier and a newly-created session identifier.

A session can unfold in a linear manner, and then involve a cascaded succession of communications means, each drawing into in the session one and only one next communications means. A session can equally well not unfold in a linear manner, in which case a "source" communications means can draw simultaneously into the current session at least two communications means each intended to make a specific contribution to the processing of data to be accomplished during the session, rather than just one such means.

One particular embodiment of the above variant of the method of the invention can further include a step of generating first and second branch identifiers, each linked to the same session identifier, this step being intended to be executed at the time of simultaneously establishing first and second links both involving the same source communications means, any call identifier intended to be transmitted by these source communications means via one of the first and second links then being linked simultaneously to the session identifier and to one of the first and second branch identifiers, respectively.

In this particular embodiment, the source communications means can assign respective destinations to different sets of service information by means of different branch identifiers.

The session identifiers can be generated in various ways and by various entities of a telecommunications system in which the invention is used. Thus the session identifier could be generated by the user's terminal if that terminal is the session initiator. The session identifier could alternatively be generated by the first communications means, for example the upstream server, with which the terminal of the user will have been communicating via the main communications network. Another possible alternative is for this session identifier to be generated by a manager of the main communications network via which the various communications means are intended to communicate with each other. Furthermore, storing the session identifier in different intermediate servers, sometimes call "proxy" servers, could be envisaged, so that there would be no risk of losing the session identifier in the event of accidental breaking of the communications chain constituting the current session.

The call identifiers could also be generated in different ways and by different communications means liable to be involved during a session. In one particular embodiment of the invention, in which the service information is intended to be stored in a server able to communicate via a specific communications network with the various communications means intended to be activated during a session, the step of identifying the call identifier can advantageously be executed by said server at the request of one of said communications means.

This embodiment is advantageous in that all the call identifiers are created and managed in a centralized manner by an element separate from the communications means but able to communicate with each of them. This specific server, referred to below as the service information server, can equally well generate the session identifier, for example at the request of the first communications means to which the user's terminal has been connected.

In other embodiments of the invention, each communications means could be adapted to create a call identifier itself and merely inform the service information server by notifying it of this creation or by soliciting writing of data at an address defined by the call identifier created in this way. However, there would be a risk of such decentralized generation causing collisions between writing instructions coming from different communications means that have separately designated the same address defined by identical call identifiers.

In one hardware aspect, insofar as it is obtained directly by using the method described above, the invention also provides a signal intended to be transmitted between two communications means involved in a same session which signal includes an address by means of which a set of service information is referenced, said address being representative of an identifier of the current session.

In another hardware aspect, the invention provides a telecommunications system adapted to transmit data and service information associated with said data, including addressing means adapted to reference at least one set of service information by means of an address, which system is characterized in that said addressing means are adapted to include a session identifier in said address.

According to a variant of this other hardware aspect of the invention, the above system may further include:
means for generating a call identifier intended to form part of the address assigned to a given set of service information and to be linked temporarily to a session identifier specific to the session concerned; and
means for transmitting said call identifier via a signaling link set up between two communications means.

Such a telecommunications system advantageously further includes means for generating first and second branch identifiers, each linked to the same session identifier, which generator means are adapted to be activated during simultaneous setting up of first and second links both involving the same source communications means, any call identifier intended to be transmitted by this source communications means via one of the first and second links then being linked simultaneously to the session identifier and to one of the first and second branch identifiers, respectively.

In one particularly advantageous embodiment of the invention, the above system preferably includes a service information server in which the service information is intended to be stored and which is adapted to communicate via a specific communications network with the various communications means intended to be activated during a session, said service information server including the call identifier generator means that are intended to be activated at the request of one of said communications means.

A further hardware aspect of the invention, by way of means useful for its implementation, provides a data server adapted to be included in a telecommunications system adapted to transmit data and service information associated with said data, which data server is adapted to store a set of service information referenced by means of an address representative of a session identifier.

A further hardware aspect of the invention, by way of other means useful for its implementation, provides a data medium intended to be included in a telecommunications system adapted to transmit data and service information associated with said data, which data medium is intended to contain a set of service information and is provided with means for referencing said set by means of an address representative of a session identifier.

DETAILED DESCRIPTION OF THE DRAWINGS

Figure 1:
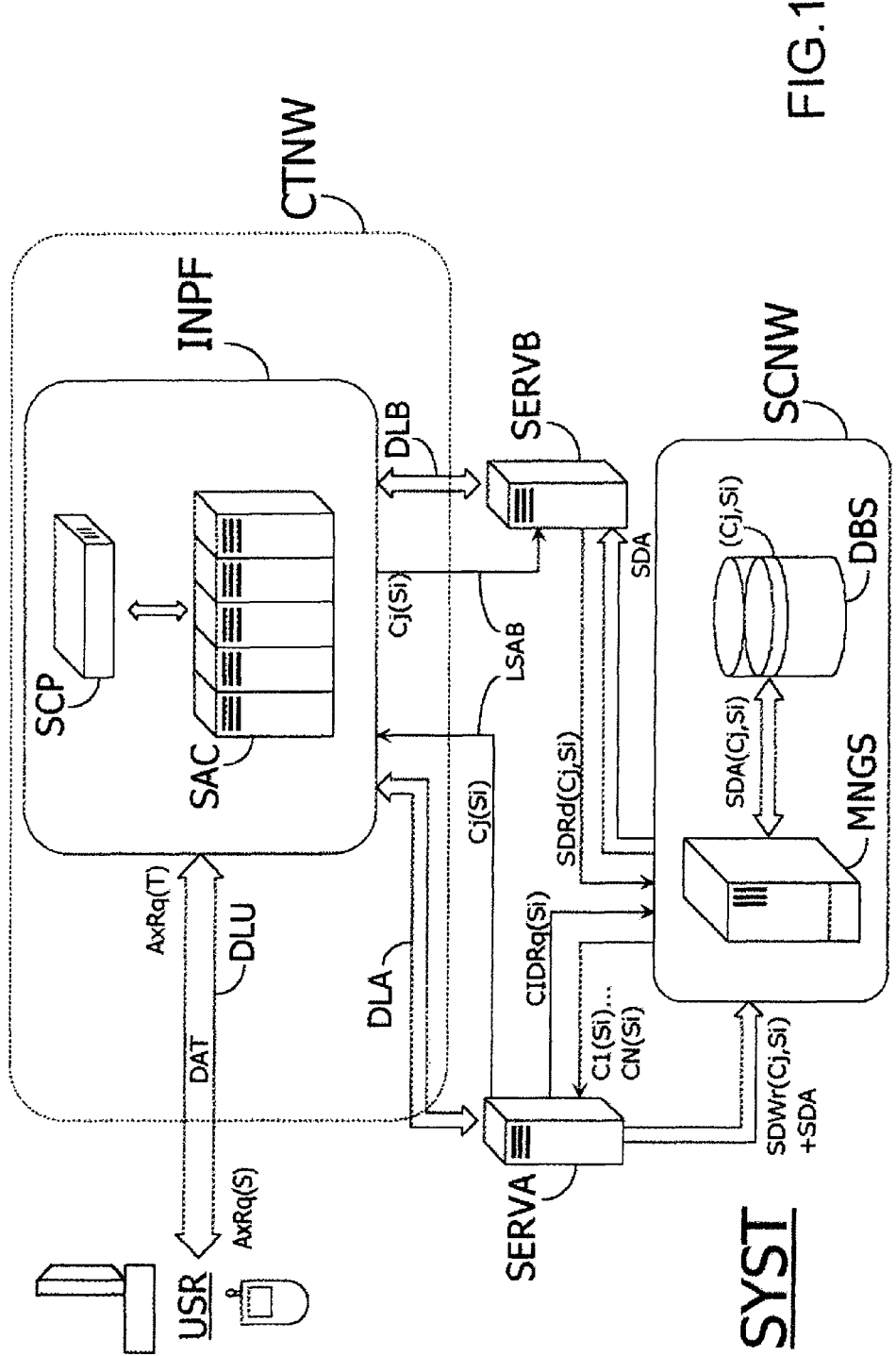
FIG. 1 is a functional block diagram representing one possible mode of operation of a telecommunications system in which a method of the invention is used.

FIG. 1 is a diagram of a telecommunications system SYST including means for implementing a transmission method conforming to the invention. This system SYST is for transmitting data DAT between a terminal made available to a user USR of the system SYST, for example a mobile telephone, a personal digital assistant provided with send/receive functions, or a microcomputer or a multimedia console, and a multiplicity of communications means, which in the example described here are upstream and downstream data servers SERVA and SERVB, all of which can communicate with one another via data links DLU, DLA and DLB set up within a main communications network formed by a switched telephone network CTNW. In the embodiment of the invention represented here, the terminal can send an access request AxRq(T) containing instructions identifying a service defined by the user USR, for example by means of an alphanumeric keypad, a graphical interface or a voice control tool. After studying the instructions contained in the access request AxRq(T), an intelligent network platform INPF routes the data DAT sent by the terminal of the user USR to the upstream data server SERVA identified by the platform INPF as that best able to address the enquiry sent by the user USR and therefore as the first addressee of the call initiated by the user USR. The intelligent network platform INPF usually includes an access switch SAC controlled by a service control point SCP and is in itself well-known to the person skilled in the art and so is not described further herein.

When the upstream server SERVA receives the data DAT from the terminal of the user, it simultaneously receives service information relating to said data DAT, and must attend to its integrity and where applicable its storage. In fact, it will often be the case that the upstream server SERVA is not capable, on its own, of exhaustively processing the enquiry AxRq(T) send by the user USR, in which case said upstream server SERVA must call on another server SERVB, called the downstream server, to process certain aspects of the enquiry. Assuming this is the case, the upstream server SERVA advises the platform INPF of the necessity for the intervention of the downstream server SERVB, which is then called on by said platform INPF and receives from the upstream server SERVA the data that it is intended to process. For example, the upstream server SERVA could support a general information service and receive from the user USR an enquiry aimed at contacting a stamp-collectors' club near the user's geographical location, which is included in the service information. The downstream server SERVB corresponding to the targeted stamp-collecting club is then drawn into the communications session in progress in order to respond to the enquiry from the user USR. The successive connections of the terminal USR to the upstream server SERVA and then of the upstream server SERVA to the downstream server SERVB are part of the same string of successive activations of communications means and are therefore included in the same communications session. It is furthermore entirely realistic to envisage that the user USR may in the meantime have terminated the connection with the main communications network CTNW and that the upstream and downstream servers SERVA and SERVB continue to process the enquiry AxRq(T) initially sent by the user USR. Following this processing, the downstream server SERVB or the upstream server SERVA could in turn seek a connection to the terminal of said user USR by means of an access request AxRq(S) sent via the main communications network CTNW in order to supply to that user USR the result of processing the original enquiry AxRq (T), all the calls described above remaining within the context of the same communications session, even though the user USR has been temporarily absent from the session. In other embodiments of the invention, the upstream server SERVA could furthermore draw a terminal into the communications session in progress instead of the downstream server SERVB, in particular a terminal other than that made available to the user USR.

In the embodiment of the invention represented here, when the upstream server SERVA has received the initial enquiry AxRq(T) and has deduced from it that the intervention of a downstream server is necessary for at least some of the processing of said enquiry, the upstream server SERVA sets up a call to a service information server MNGS in order to organize specific addressing of the service information received m parallel with the initial enquiry AxRq(T). This call takes the form of a request CIDRq(Si) for a call identifier linked to the current session, previously identified by means of a session identifier Si defined either by the intelligent network platform INPF or by the upstream server SERVA. In other embodiments of the invention, the upstream server SERVA can also request the service information server MNGS to define the session identifier Si. Here the service information server MNGS is adapted to communicate with the various communications means intended to be activated during a session via a specific communications network SCNW, for example a dedicated Intranet-type network. In this embodiment, in response to the call identifier request CIDRq(Si), the service information server MNGS supplies the upstream server SERVA with a plurality of call identifiers Cl(Si) . . . CN(Si) that are all linked to the same session identifier Si. In other embodiments of the invention, the call identifiers Cl . . . CN can be generated in groups without being linked in advance to a particular session. The upstream server SERVA, can then send the service information server MNGS a write request SDWr(Cj,Si) in order to store at an address defined by a conjunction of the call identifier Cj with the session identifier Si a set SDA of service information that is intended for the downstream server SERVB. The service information server MNGS stores this set of information on a data medium, here in a database DBS including a hard disc or an optical disc, for example, at an 'address including simultaneously the call identifier Cj and the session identifier Si. The upstream server SERVA can then send the downstream server SERVB the call identifier Cj(Si) via a signaling link LSAB set up by means of the main communications network CTNW. As a result, if the downstream server SERVB receives from the platform INPF a request to intervene in the current session, said downstream server SERVB simultaneously receives via the signaling link LSAB an address at which it can recover the service information stored at the instigation of the upstream server SERVA. The downstream server SERVB then sends a read request SDRd(Cj,Si) to the service information server MNGS and obtains in return the set SDA of service information initially stored on the instructions of the upstream server SERVA at the address defined by the call identifier in conjunction with the session identifier (Cj,Si).

In the above example, a single call identifier Cj(Si) is used, but it must be understood that in this particular embodiment of the invention the upstream server SERVA can store a number N of sets SDj (for j=1 to N) of service information, each intended to be identified by means of a call identifier Cj (for j=1 to N), which makes the system SYST very flexible to use, since storage can be effected dynamically, and therefore at any time, even after the user USR has disconnected from the main communications network CTNW. Similarly, the downstream server SERVB can also be assigned call identifiers linked to the identifier Si of the current session, in order in turn to command storage of service information identical to or different from the set SDA that it has received from the upstream server SERVA, which information could be intended for other servers downstream of the downstream server SERVB, but could also be intended for upstream communications means such as the upstream server SERVA or the terminal of the user USR.

Figure 2:
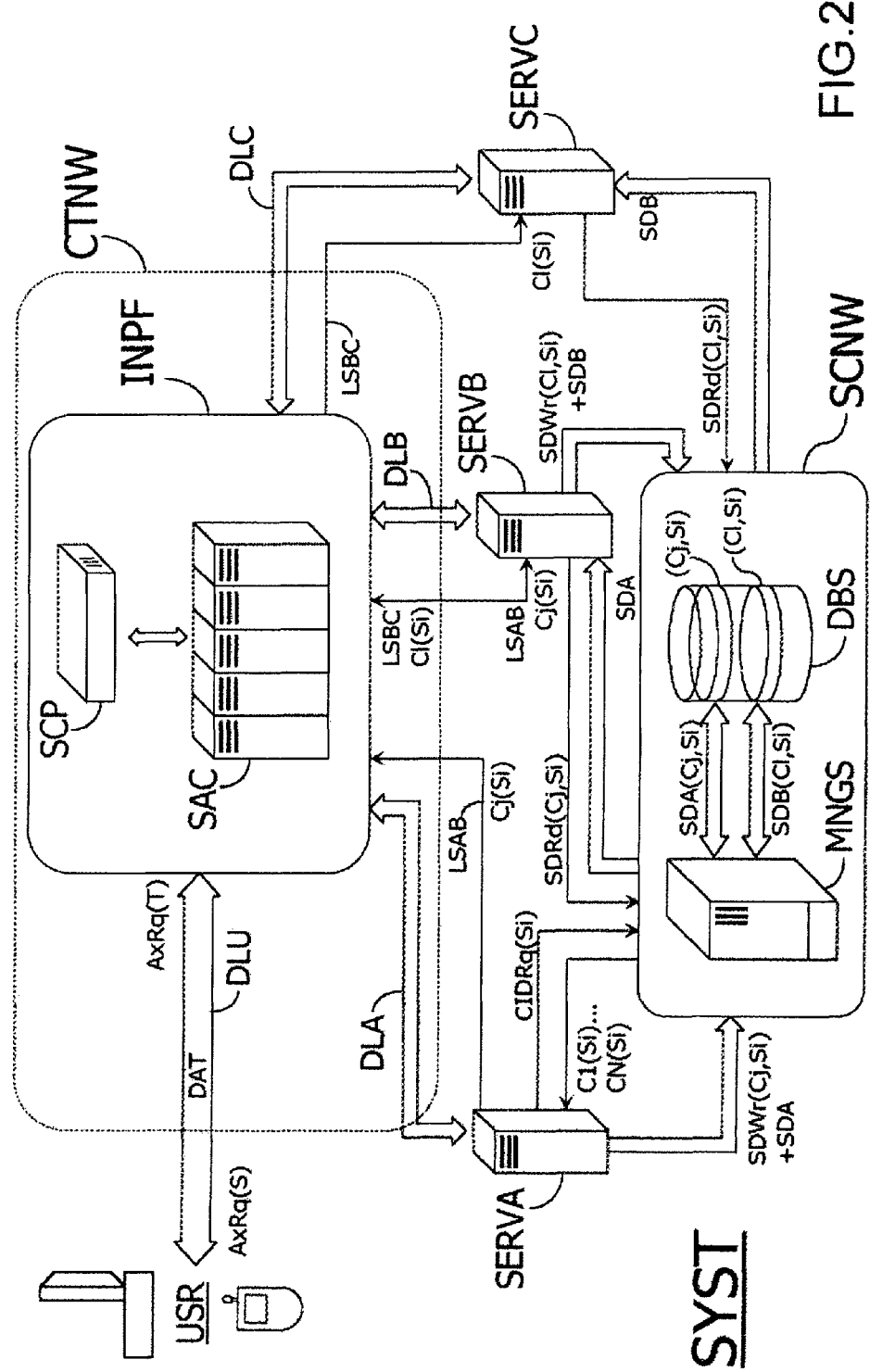
FIG. 2 is a functional block diagram that represents another possible mode of operation of such a telecommunications system.

FIG. 2 illustrates a situation in which the downstream server SERVB has solicited the service information server MNGS to store a new set SDB of service information by means of a write request SDWr(C1,Si) specifying an address defined by the conjunction firstly of a call identifier C1 previously reserved for said downstream server SERVB, and secondly of the session identifier Si. As far as possible, in order to facilitate understanding the description, elements common to the preceding figure have been assigned the same reference symbols. Here the downstream server SERVB is adapted to draw into the session another downstream server SERVC by means of a signaling link LSBC and so can also send said other downstream server SERVC the call identifier C1(Si) that will enable that other downstream server SERVC to recover, by means of a read request SDRd(C1,Si), the set of information SDB that was stored for it on the instructions of the server SERVB.

Although, in the examples described above, the service information SDA, SDB has simply to be kept available to the various communications means and thus to be communicated only if the service information server MNGS receives a request to that effect, in other embodiments of the invention said service information server MNGS can have functions for spontaneously sending sets of service information to communications means identified beforehand by the server that stored said sets, the sending by the upstream server SERVA of the call identifier Cj(Si) is no longer necessary, and likewise the read request SDRd(Cj,Si) sent by the downstream server SERVB is rendered superfluous, since the service information server MNGS sends the set SDA directly to the server SERVB in this case.

Figure 3:
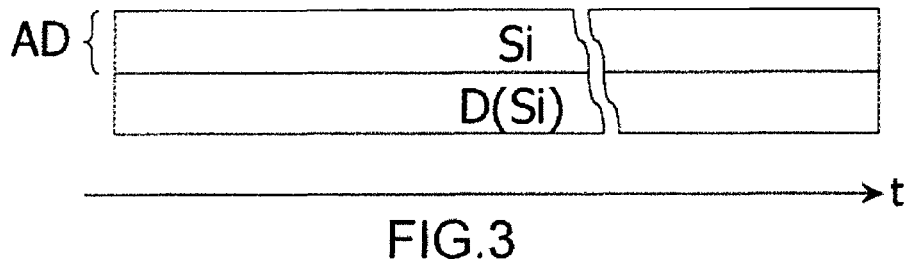
FIG. 3 is a timing diagram that illustrates an addressing mode conforming to the invention.

FIG. 3 is a highly diagrammatic illustration of the addressing system of the present invention in its most elementary form, in which a set of service information D(Si) is referenced by means of an address AD that here consists exclusively of the session identifier Si. Accordingly, as described above, this elementary form of the invention provides permanent service information D(Si) throughout the session and therefore offers a considerable advantage over the current state of the art.

In the sense of the present description, a set of service information must be understood as a group of information that relates to a certain type of information content, for example three coordinates in different directions forming a set of information for communicating the accurate spatial position of an object or a user to the addressee of that set.

Figure 4:
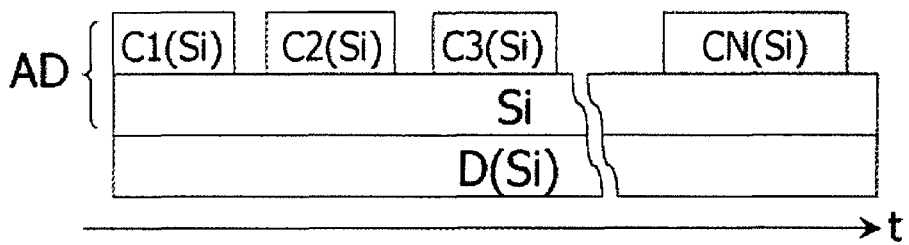
FIG. 4 is a timing diagram that illustrates an addressing mode conforming to a variant of the invention.

FIG. 4 shows a variant of the information that achieves additional advantages in terms of flexibility since, in accordance with the above description, through the use of multiple call identifiers Cj(Si) (for j=1 to N) all linked to the single session identifier Si described above, this variant can reference multiple different sets of service information D(Si), where applicable stored dynamically, each address AD of one of these sets being then constructed as a conjunction firstly of the session identifier Si common to all the sets, and secondly of a call identifier Cj(Si) specific to each set.

Figure 5:
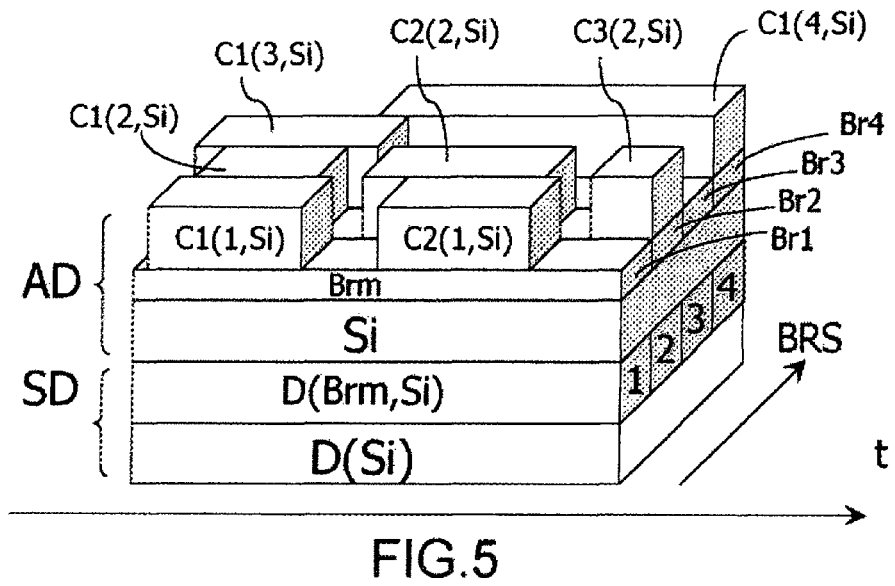
FIG. 5 is a timing diagram that illustrates an addressing mode conforming to a particularly advantageous embodiment of this variant of the invention.

FIG. 5 shows a preferred embodiment of this variant of the invention that provides even more advantages in terms of flexibility. In the example described here, the session defined by the identifier Si does not unfold linearly, it being assumed that the source communications means draw simultaneously into the current session not just one but four different communications means each intended to make a specific contribution to the processing of the data to be accomplished during the session Si.

The service information SD stored in the server provided for this purpose thus includes in this example not only information D(Si) accessible to all those involved in the session Si but also information D(Brm,Si) (for m=1 to 4) specifically intended for first, second, third, and fourth communications means respectively connected to the source communications means by first, second, third, and fourth signaling links. The source communications means then has sent to each of those first, second, third, and fourth communications means call identifiers Cj(m,Si) enabling their addressees to consult sets of service information (Brm,Si) (for m=1 to 4) that are reserved for them. Each address AD of one of the sets (Brm, Si) is therefore constructed as a conjunction firstly of the session identifier Si common to all the sets, and secondly of a call identifier Cj(m,Si) specific to the addressee concerned.

Figure 6:
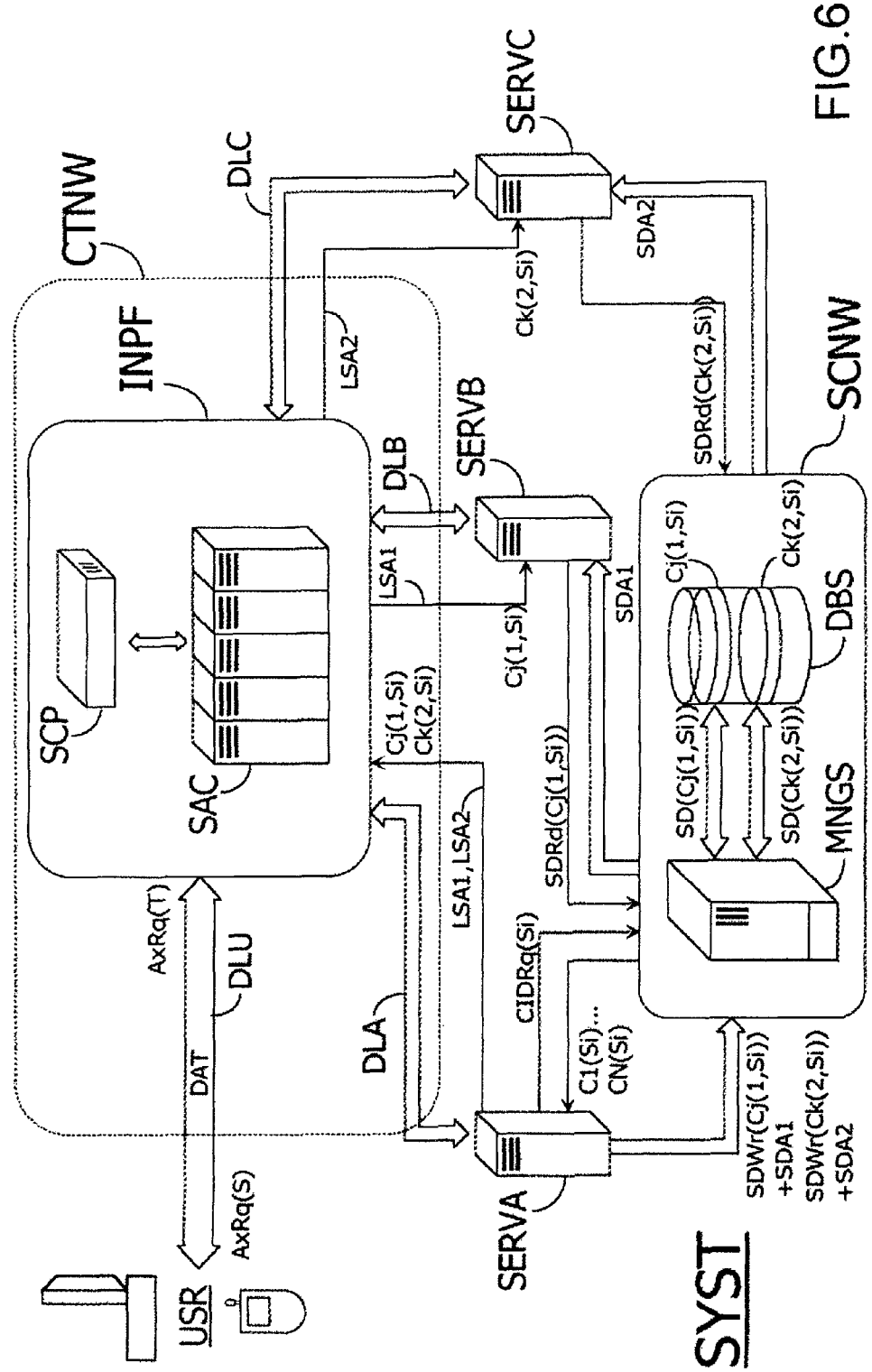
FIG. 6 is a functional block diagram that represents a telecommunications system using a method constituting a particularly advantageous embodiment of this variant.

FIG. 6 represents a telecommunications system SYST in which this preferred variant of the invention is used. As far as possible, in order to facilitate understanding the description, elements common to the preceding figures have been assigned the same reference symbols. In this particularly advantageous embodiment of the invention, a terminal made available to a user USR and three servers SERVA, SERVB, and SERVC are adapted to exchange data between them by means of data links DLU, DLA, DLB and DLC and an intelligent network platform INPF. The servers SERVA, SERVB and SERVC are further adapted to communicate with a service information server MNGS via a specific communications network SCNW, for example of the dedicated Intranet type. Given the assumption illustrated by the present figure, the upstream server SERVA, having received data and associated service information from the terminal made available to the user USR, finds that it must draw simultaneously into the session not just one but first and second downstream servers SERVB and SERVC, in order to address the request AxRq(T) sent by the user USR. The upstream server SERVA therefore sends simultaneously first and second write requests SDWr(Cj(1,Si)) and SDWr(Ck(2,Si)) accompanied by first and second sets of service information SDA1 and SDA2 respectively intended for the first and second downstream servers SERVB and SERVC, said first and second sets of service information SD1 and SD2 being referenced by means of addresses Cj(1,Si) and Ck(2,Si) each consisting of a call identifier Cj or Ck that is simultaneously linked to the second identifier Si and to a link identifier 1 or 2. The upstream server SERVA then sends the call identifiers Cj(1, Si) and Ck(2,Si) simultaneously to the first and second downstream servers SERVB and SERVC via first and second links, which here are signaling links LSA1 and LSA2 different from the data links DLB and DMC, so that each of these first and second downstream servers SERVB and SERVC can recover all of the service information SDA1 or SDA2 that is intended for it by sending the service information server MNGS a read request SDRd(Cj(1,Si)) or SDRd(Ck(2,Si)) specifying the call identifier Cj(1,Si) or Ck(2,Si) assigned to it by the upstream server SERVA.

The above description shows not only that the invention ensures the permanence of the service information relating to a communications session throughout said session, but also that diverse variants of the invention further provide for dynamic enrichment of the service information, together with making that service information secure by using for addressing purposes multiple call identifiers specific to the information concerned and/or its addressees.

The invention claimed is:

1. A method of transmitting data and service information associated with the data, the method comprising:
   establishing an address for storing and referencing by means of the address a set of service information received from a user terminal, wherein the address comprises a session identifier for a session initiated by the user terminal;
   generating a call identifier which is used to form part of the address assigned to the set of service information and which is linked temporarily to the session identifier;
   transmitting the call identifier via a signaling link set up between two communications devices; and
   generating first and second branch identifiers each linked to the session identifier, the generating being done at the time of establishing first and second links both involving a same source communications device, any call identifier which is transmitted by the source communications device via one of the first and second links being then linked both to the session identifier and to one of the first and second branch identifiers, respectively.

2. The method according to claim 1, wherein the set of service information is stored in a server adapted to communicate via a specific communications network with the various communications devices adapted to be activated during a session, and the generating of the call identifier is executed by the server at the request of one of the communications devices.

3. The method according to claim 1, wherein a plurality of call identifiers are generated for the session identifier in response to the received call identifier generation request, and at least one of the plurality of call identifiers is used to establish a second address for storing a second set of service information associated with the session identifier.

4. The method according to claim 1, wherein the call identifier generation request is received independently of the data transmitted during the session.

5. A telecommunications system adapted to transmit data and service information associated with the data, the system comprising:
   an addressing device adapted to establish an address for storing and referencing by means of the address a set of service information received from a user terminal, wherein the address comprises a session identifier for a session initiated by the user terminal;
   a call identifier generator adapted to generate a call identifier which forms part of the address assigned to the set of service information and to be linked temporarily to the session identifier;
   a transmitter adapted to transmit the call identifier via a signaling link set up between two communications devices; and
   a branch identifier generator adapted to generate first and second branch identifiers, each linked to the session identifier, the branch identifier generator being adapted to be activated during setting up of first and second links both involving a same source communications device, any call identifier transmitted by the source communications device via one of the first and second links then being linked to the session identifier and to one of the first and second branch identifiers, respectively.

6. The telecommunications system according to claim 5, further comprising:
   a service information server in which the set of service information is stored and adapted to communicate via a specific communications network with the various communications devices activated during the session, the service information server including the call identifier generator, which is activated at the request of one of the communications devices.

7. A data server adapted to be included in a telecommunications system according to claim 5, wherein the data server is adapted to:
   transmit data and service information associated with the data;
   store and reference via an established address a set of service information received from a user terminal, in the address comprising a session identifier for a session initiated by the user terminal; and
   receive a call identifier which is used to form part of the address assigned to the set of service information and which is linked temporarily to the session identifier.

8. The telecommunications system according to claim 5, wherein a plurality of call identifiers are generated for the session identifier in response to the received call identifier generation request, and at least one of the plurality of call identifiers is used to establish a second address for storing a second set of service information associated with the session identifier.

9. The telecommunications system according to claim 5, wherein the call identifier generation request is received independently of the data transmitted during the session.

10. A non-transitory data medium included in a telecommunications system according to claim 5, said non-transitory data medium being adapted to transmit data and service information associated with the data, which non-transitory data medium:
   stores a set of service information received from a user terminal and is provided with a referencing device adapted to reference the set of service information by means of an established address;

wherein the address comprises a session identifier for a session initiated by the user terminal; and wherein the referencing device is further adapted to receive a call identifier which is used to form part of the address assigned to the set of service information and which is linked temporarily to the session identifier.

* * * * *